United States Patent [19]
Kinsinger et al.

[11] 3,993,405
[45] Nov. 23, 1976

[54] APPARATUS FOR VIEWING A PRESELECTED ONE OF A PLURALITY OF MEDIA STORED IN A CONTAINER

[75] Inventors: William C. Kinsinger, New York; James Ippolito, Bronx, both of N.Y.

[73] Assignee: Metagraphic Systems, Inc., Bronx, N.Y.

[22] Filed: May 6, 1974

[21] Appl. No.: 467,134

[52] U.S. Cl. ............................. 353/27 A; 353/103
[51] Int. Cl.² ................... G03B 23/08; G03B 23/14
[58] Field of Search .......................... 353/26R, 26A 353/120, 103, 27 R, 27 A

[56] References Cited
UNITED STATES PATENTS

| | | | |
|---|---|---|---|
| 3,528,735 | 9/1970 | Bluitt | 353/27 |
| 3,720,464 | 1/1971 | Ditscheid | 353/27 |
| 3,743,400 | 7/1973 | Haning | 353/26 A |
| 3,754,817 | 8/1973 | Iida | 353/27 |

*Primary Examiner*—Harry N. Haroian
*Attorney, Agent, or Firm*—Lerner, David, Littenberg & Samuel

[57] ABSTRACT

Apparatus is disclosed for viewing a preselected one of a plurality of information-bearing media, such as microfilm in fiche format, from a container housing a plurality of such media. The apparatus includes a frame, with the frame having a viewing area associated therewith; first means operatively associated with the frame for moving a container housing the plurality of information-bearing media between a first and second position which includes the viewing area therebetween; and selection means for retaining a preselected one of the media in the viewing area when the container is moved from the second position back to the first position. Each medium in the container includes a trailing border portion and the length of travel of the container between its first and second positions is less than the total length of the medium such that the trailing border portion remains interleaved between remaining ones of said plurality of media when the carriage returns to its initial first position. In this manner, a medium which has been selected for viewing can be easily returned into its container. The entire frame is movably mounted on a support structure for motion in transverse directions with respect thereto such that a desired "row" and "column" frame on the information-bearing medium can be properly positioned with respect to a light source positioned thereunder.

41 Claims, 26 Drawing Figures

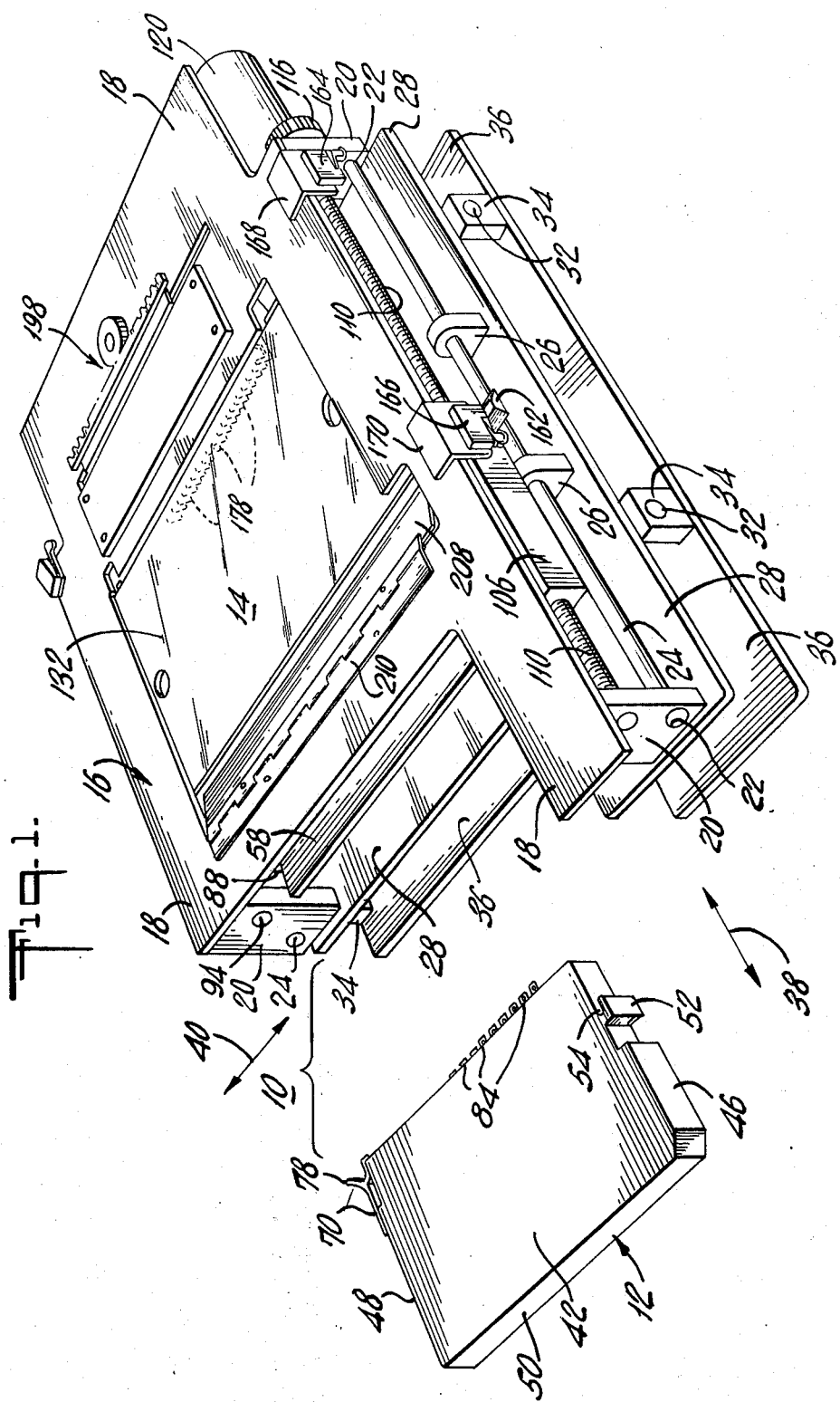

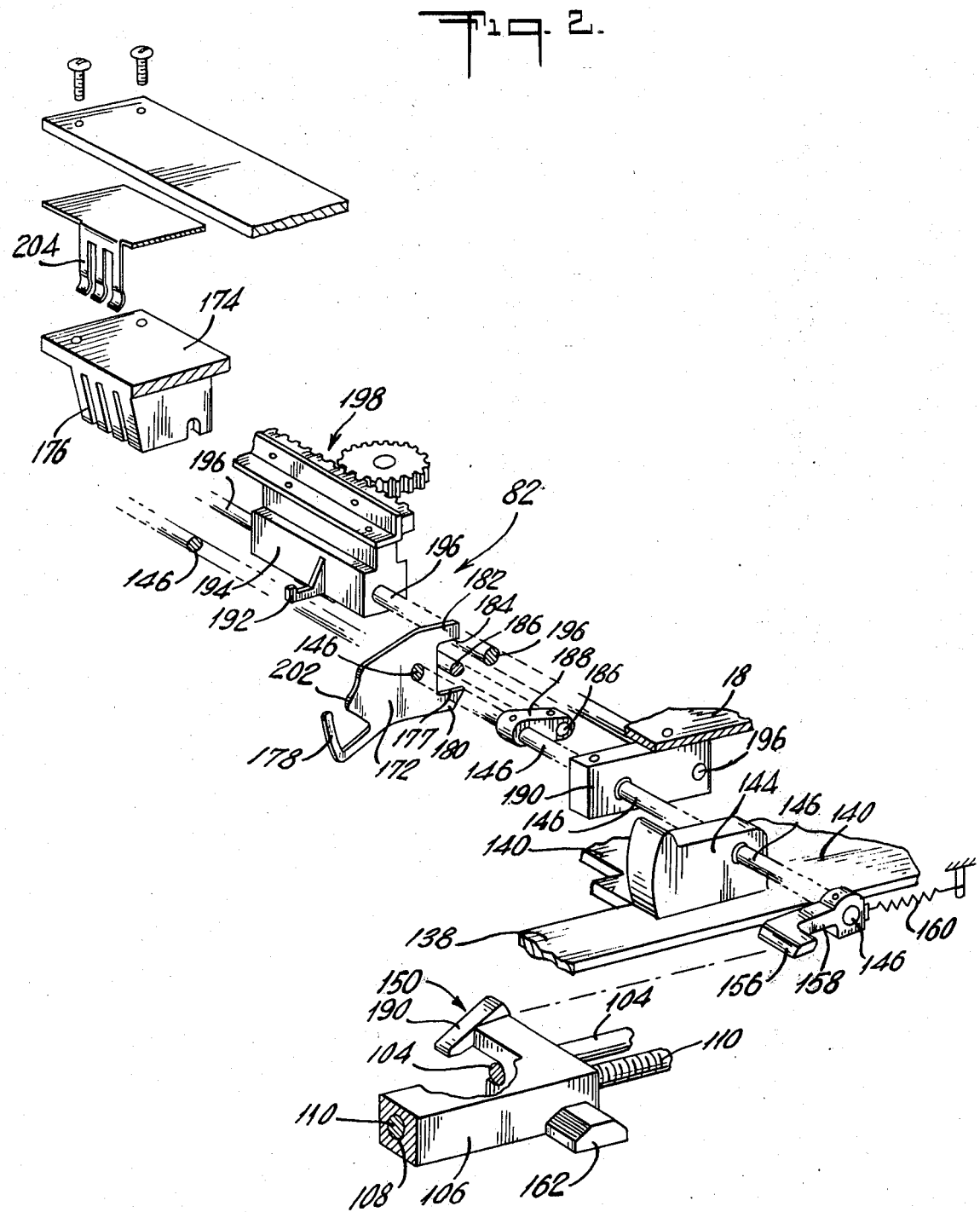

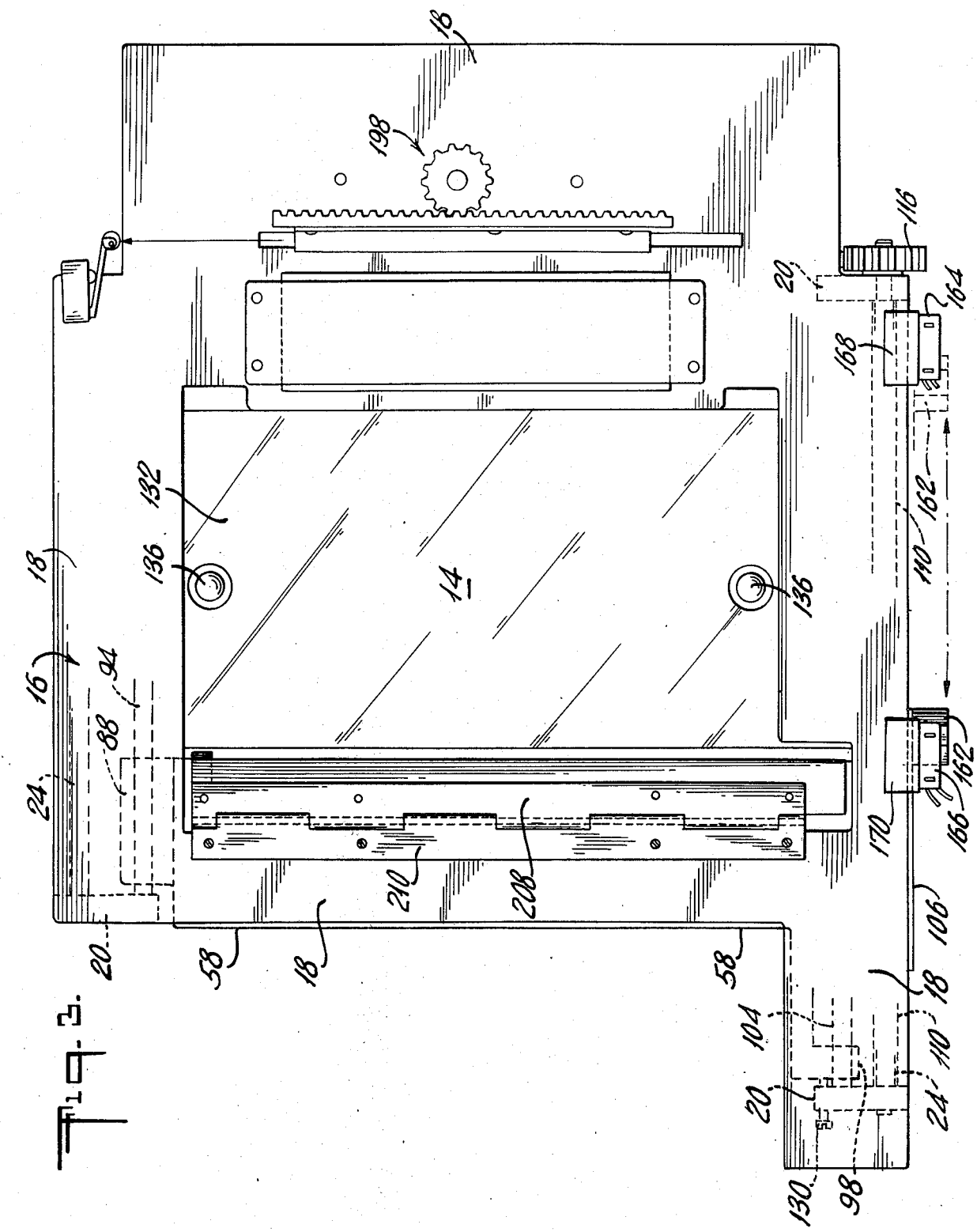

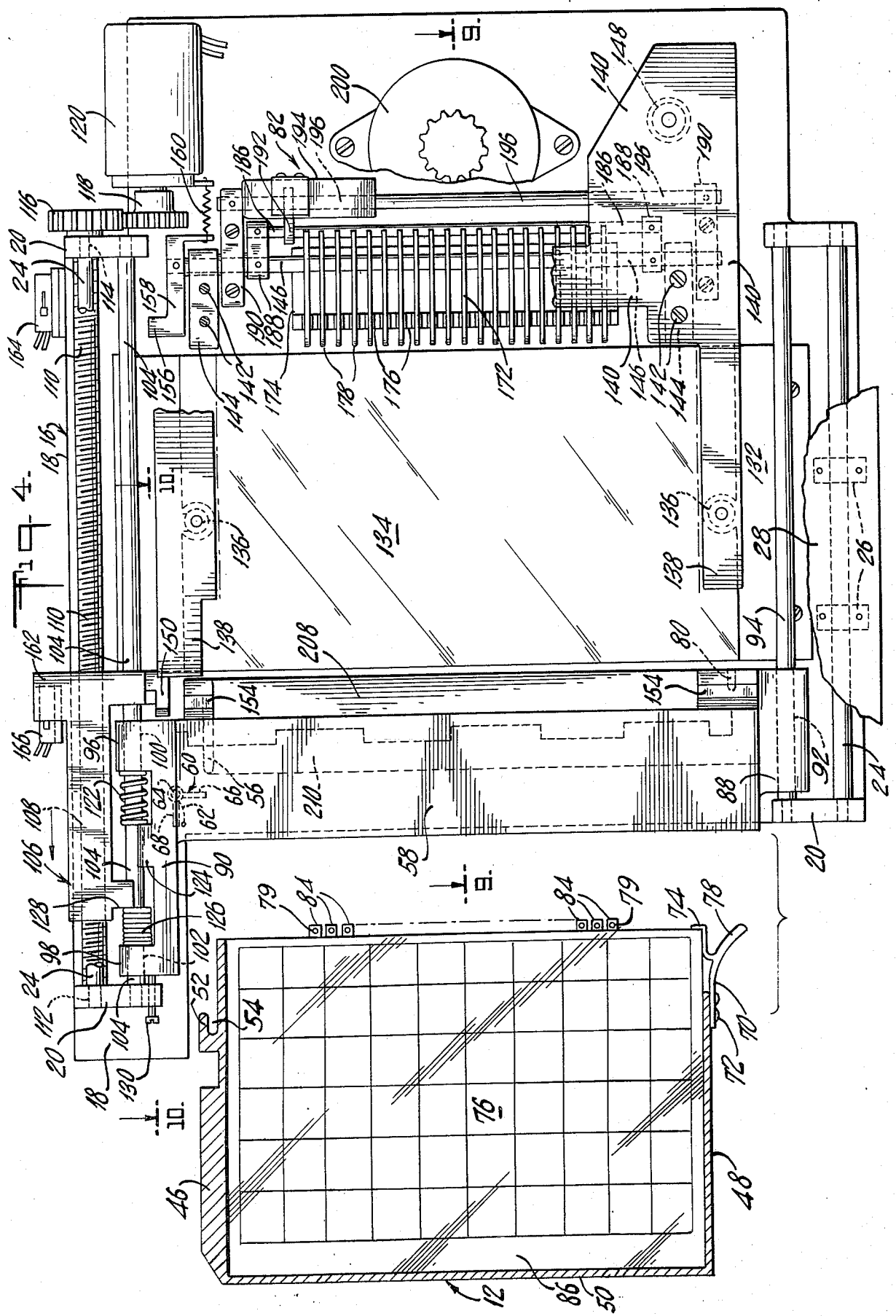

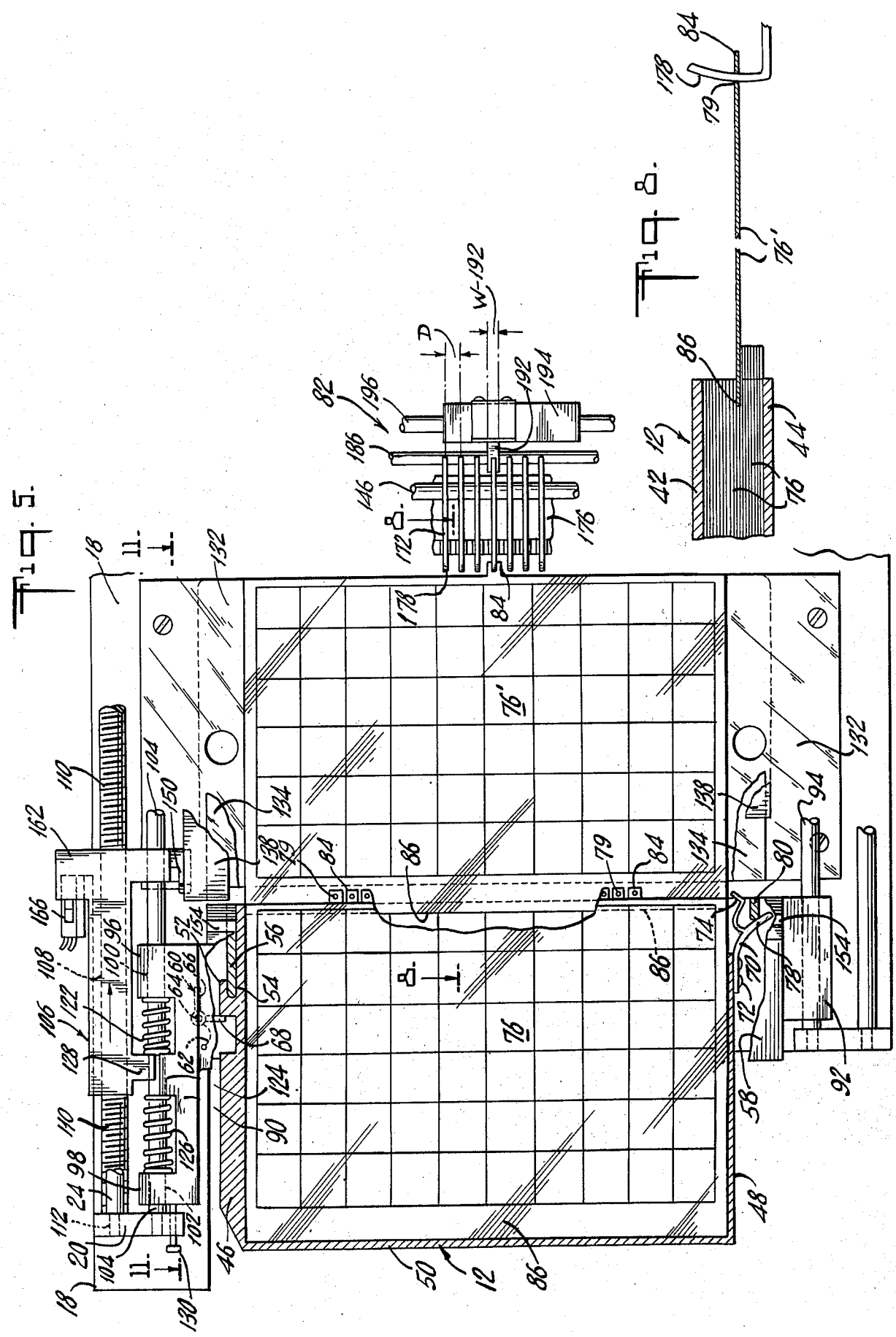

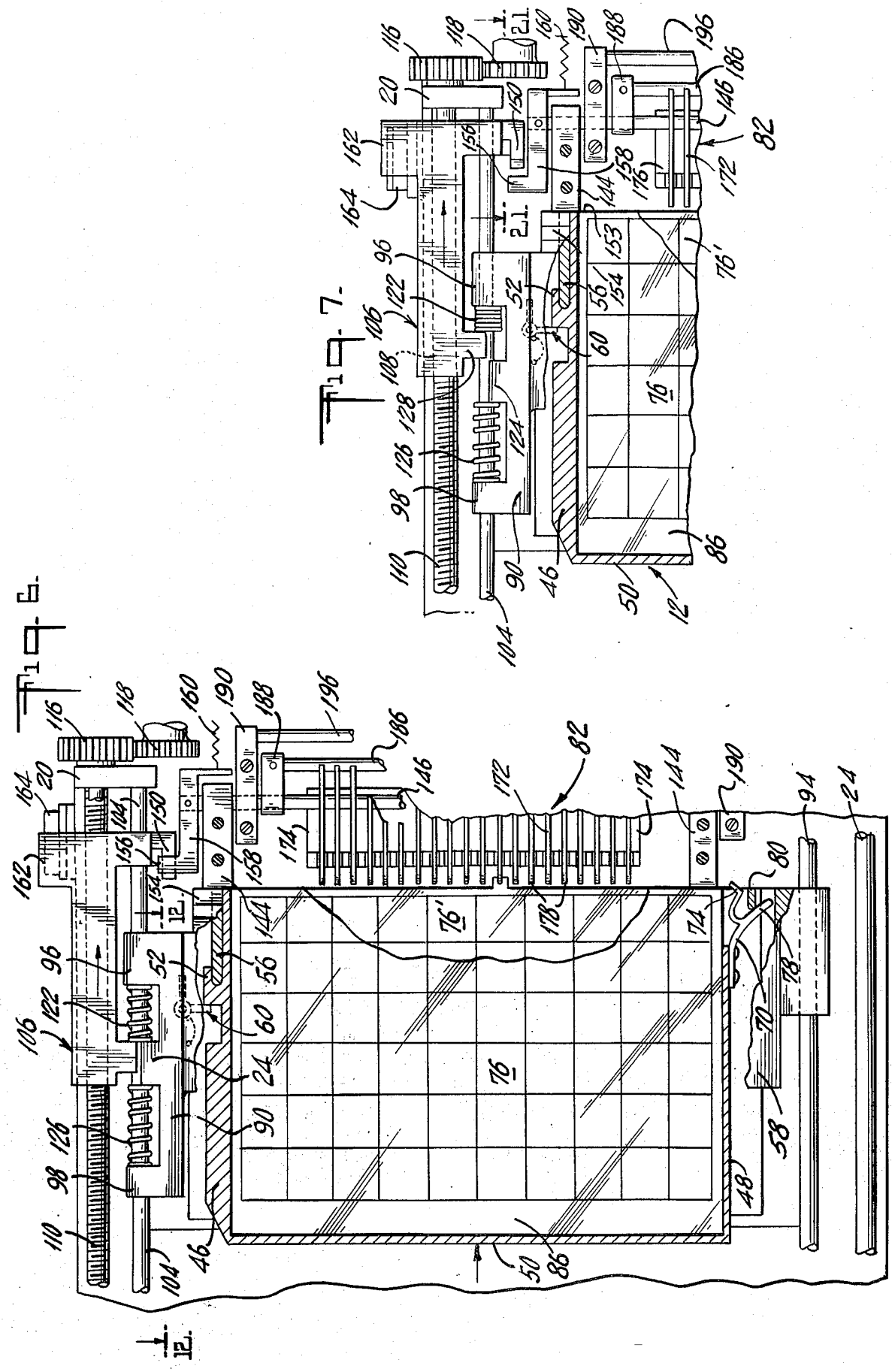

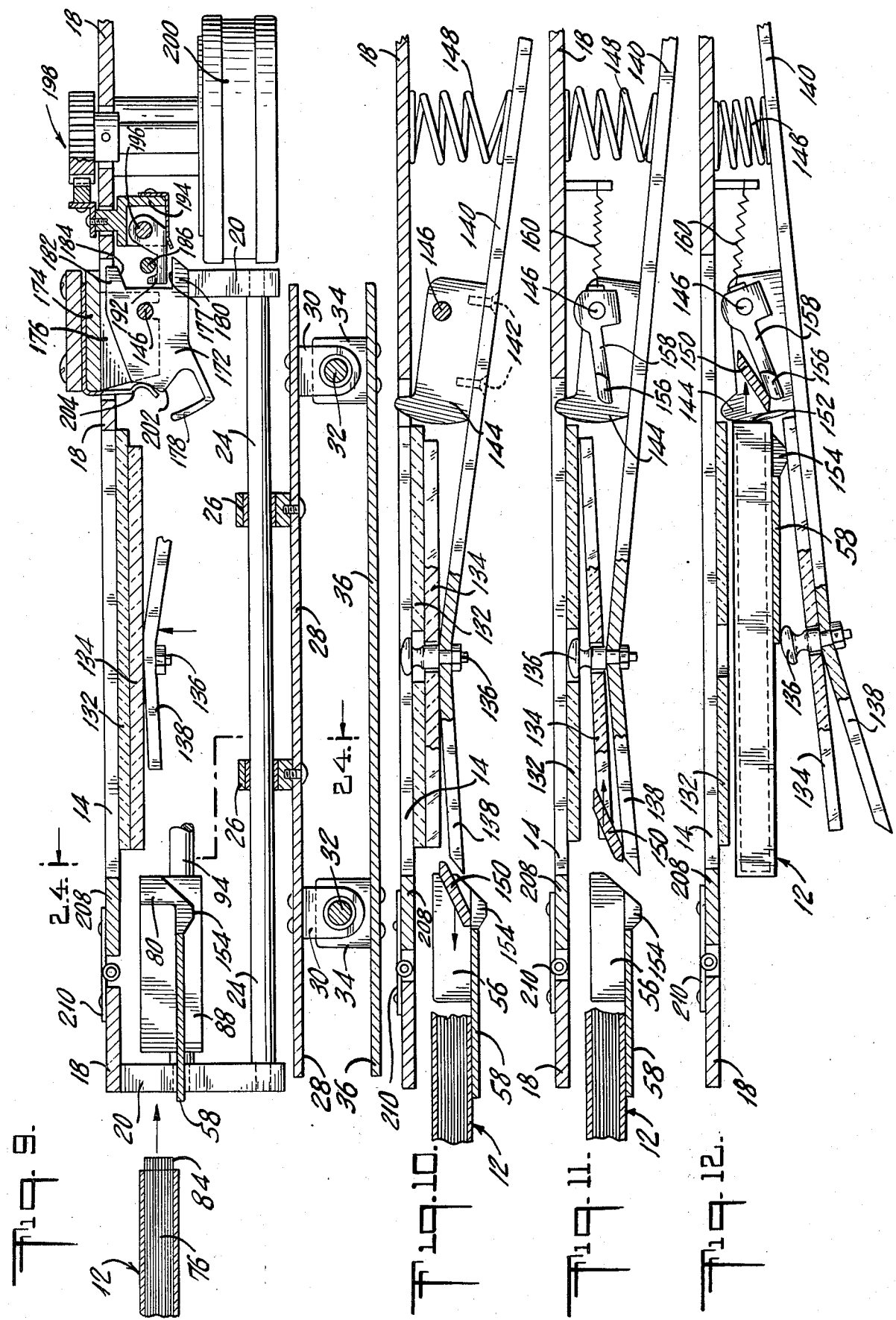

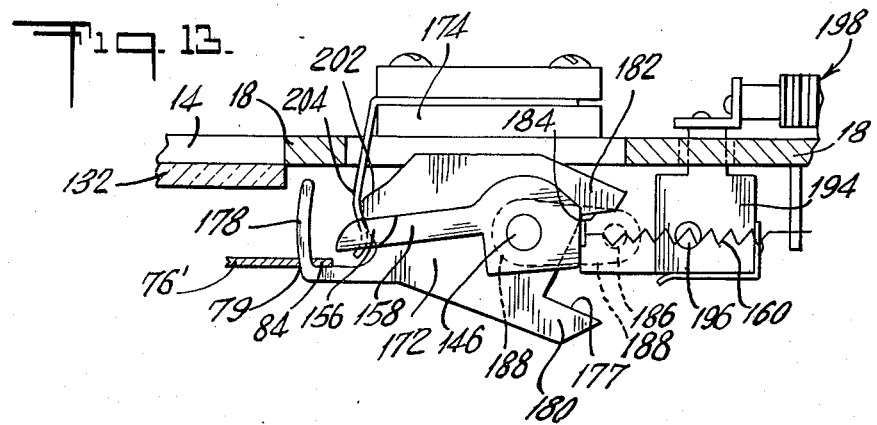
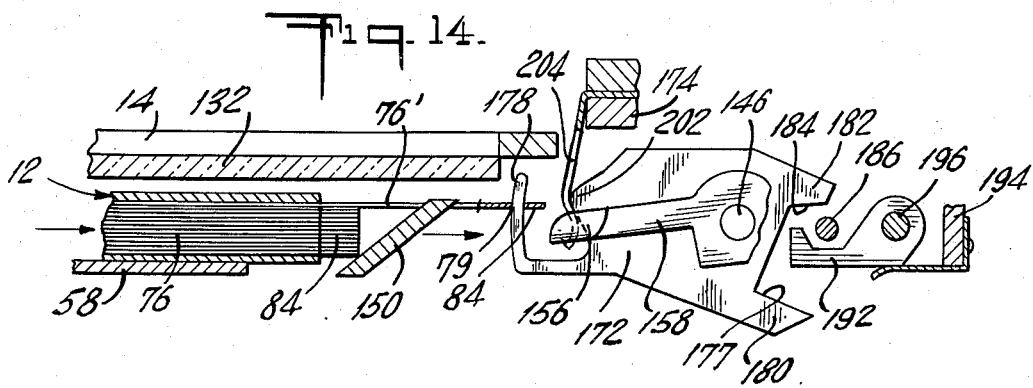
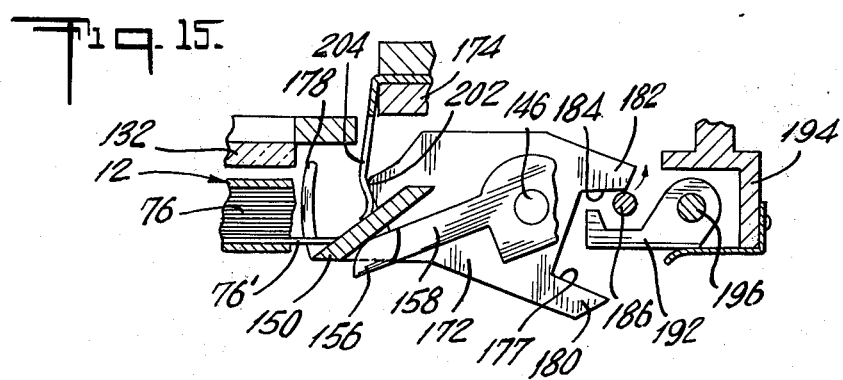
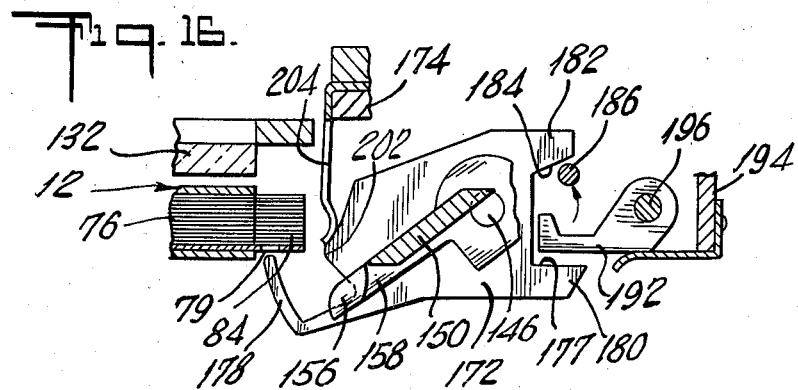

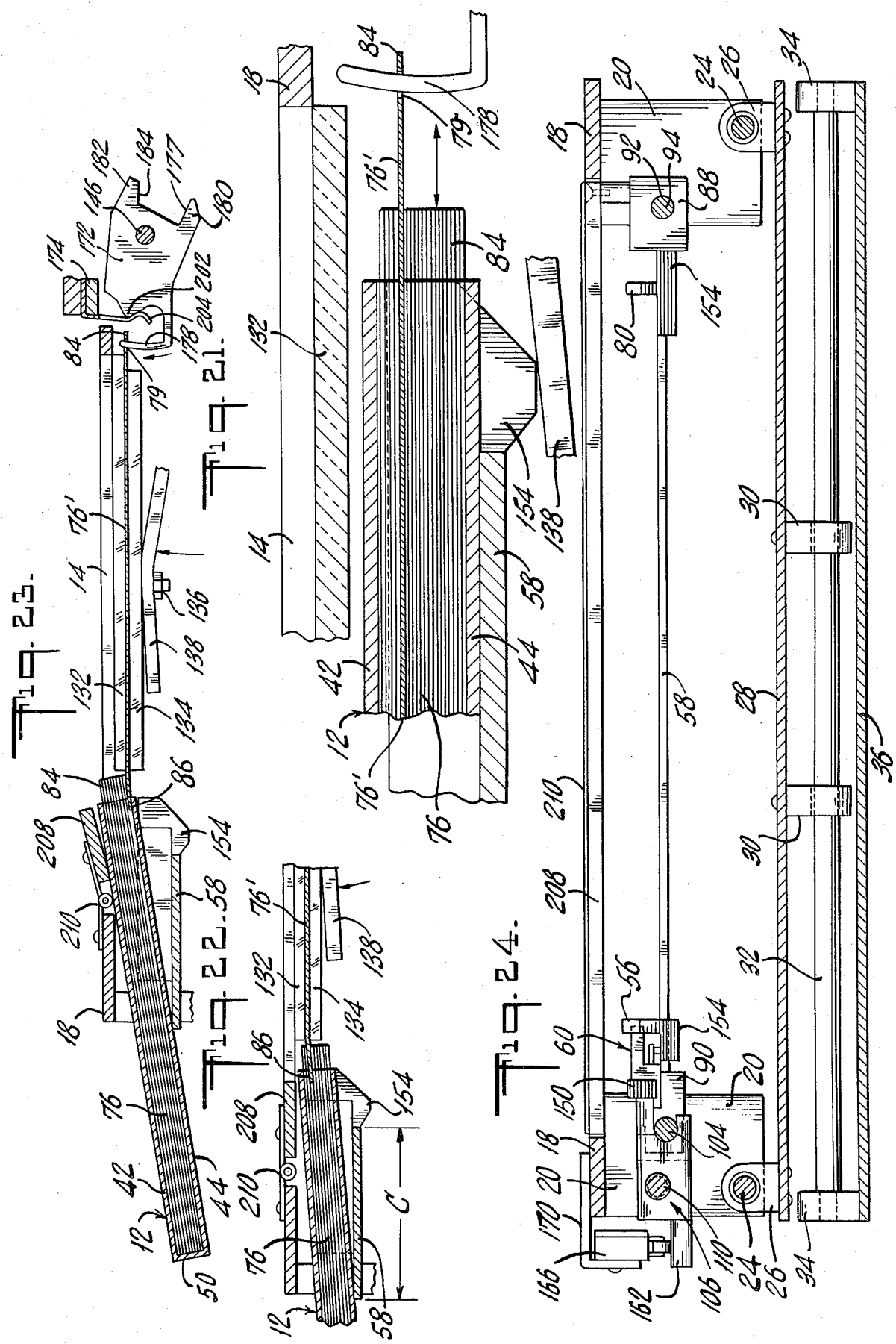

APPARATUS FOR VIEWING A PRESELECTED ONE OF A PLURALITY OF MEDIA STORED IN A CONTAINER

FIELD OF THE INVENTION

This invention relates to film viewers, more particularly to apparatus for viewing a preselected one of a plurality of information-bearing media stored in a container, and even more particularly to such an apparatus which is capable of viewing a preselected one of a plurality of microfiche stored in a cartridge.

BACKGROUND OF THE INVENTION

Microfilming of records and other information is a well-accepted practice. In many applications, microfilm is stored in roll form, while in other applications, microfilmed records are in the form of fiche which comprise individual film sheets surrounded by a rigidifying border. Such sheets are subdivided into frames identifiable by a particular "row" and "column" designation by which a particular frame can be selected for viewing above a light source by appropriate X-Y movement of the fiche.

To increase the capability of an information retrieve system based on a microfiche format, it is further known to employ a plurality of such fiche in a container or cartridge and to preselectively withdraw a desired fiche for viewing from the cartridge. Such systems are disclosed in U.S. Pat. Nos. 3,124,260; 3,754,817; 3,092,144; 3,690,753; 3,442,581; 3,713,535; and 3,528,735. Various techniques, including magnetic attraction, mechanical picker arms, and other arrangements are suggested in these various prior patents for withdrawing the preselected fiche from a cartridge housing a plurality thereof. Such arrangements, however, are relatively complex and, consequently, expensive and, in addition, have the added drawback of requiring that the preselected fiche be completely withdrawn from its associated cartridge during the viewing process, thereby making it difficult to reinsert same into the cartridge after the viewing is complete (see, for example, U.S. Pat. No. 3,584,742 which requires the blowing of fluid into the cartridge to separate the remaining fiche sufficiently to permit the reinsertion of the fiche which has been withdrawn therefrom and other prior art techniques which require electrical apparatus to nullify the static electricity effect present in the cartridge when it is desired to reinsert the fiche after viewing).

SUMMARY OF THE INVENTION

In contradistinction to the prior art, the instant invention provides a method and apparatus for viewing selected ones of a plurality of information containing media, such as microfiche, stored in a container, commonly designated a magazine, in which the media selected for viewing is not completely withdrawn from the magazine associated therewith. Rather, during the viewing of a preselected medium, the trailing border area thereof remains interleaved between remaining ones of the plurality of media in the magazine such that when viewing of the selected medium is completed, it can be easily returned to its storage position in the magazine.

In accordance with the invention, the apparatus comprises a frame with the frame having a viewing area associated therewith. First means are provided for moving the magazine between first and second positions which includes the viewing area therebetween. Selection means are provided for retaining the preselected one of the media in the viewing area when the container is returned from its second to its first initial position. The entire frame is movable in transverse directions so that a preselected row and column frame on the media can be located with respect to the light source positioned therebeneath.

As a further feature of the invention, the magazine is carried on a movable carriage driven by a novel multi-function drive arrangement provided with overtravel capabilities such that the multi-function drive arrangement can perform additional functions before and after the magazine supporting carriage has moved between its first and second positions. For example, and as will be described in greater detail, such multi-function drive means may initially urge a pressure plate (subsequently employed for biasingly maintaining the preselected medium in its viewing position) out of the path of the magazine supporting carriage before the carriage actually begins to move the magazine between its first and second positions. In like fashion, after the carriage has been moved to its second position, the multi-function drive means continues traveling in the same direction to first reset selection means provided in the viewing apparatus, and then after a reversal of direction, to actuate the selection means to "pick" the preselected medium which is to be viewed, this latter operation taking place before the magazine supporting carriage begins its return travel from its second position back to its first position. Finally, after the magazine supporting carriage is returned to its first position, the multi-function drive means continues to travel in its second direction to disengage the aforementioned pressure plate and allow it to biasingly engage the undersurface of the selected medium for retaining same in the viewing position.

In further accord with the inventive features hereof, it is noted that conventional microfiche normally include a stiffening border thereabout. Typically, a relatively wide front border region functions as the title are (upon which is imprinted the title of the particular fiche) and a significantly narrower border area constitutes the trailing edge. In accordance with a further aspect of the invention, it is the trailing area of the microfische which are provided with apertured tabs by which the fiche may be selected for viewing and the fiche thereafter inserted backward, so to speak, in the associated magazine whereby the wider title area of the fiche is available to remain interleaved between the remaining ones of the fiche stored in the magazine when the selected medium is retained in the viewing area.

As a further feature of the invention, novel selection means, to be described in greater detail, is provided to select and retain the preselected medium in the viewing area. Such selection apparatus includes a plurality of selector keys rotatably supported in spaced-aligned relationship with each of the keys including a rearwardly extending select-activating surface and a forwardly extending picker-arm extension which will be rotated between a reset and select position in response to the select-activating surface being depressed. Actuating means, preferably in the form of an elongated shaft, is normally located at a first position a first predetermined distance above the select-activating surfaces of each of the keys, with said activating means being movable between a first position and a second position which is a second predetermined distance above the select-activating surfaces. A laterally displaceable selector is provided which may be selectively interposed between the actuating means and a preselected one of the select-activating surfaces to be depressed in response to the activating means moving between first and second positions. The keys are spaced from one another by a predetermined distance and the selector has a width slightly less than the predetermined distance whereby the correct key will be activated without the requirement of maintaining close tolerances in the design.

The same keys include a rearwardly extending reset-activating surface which when engaged causes its corresponding picker arm extension to be rotated between its select and reset position. Further, the activating means is additionally movable between the aforementioned first position and a third position which will engage the reset activating surface of any of the keys which happen to be in the select position to rotate same to its reset position. In this manner, rotation of the activating means in a first direction will cause resetting of the selection apparatus, while rotation of the actuating means in a second direction will cooperate with the aforementioned selector to move a preselected key and picker arm extension associated therewith from its reset to a select mode. As suggested above, the aforedescribed selection apparatus is particularly advantageously employed in conjunction with the aforedescribed multi-function drive means, whereby reset and select operations may take place during the overtravel of the multi-function drive means.

Accordingly, it is an object of the instant invention to provide apparatus for viewing one of a preselected plurality of medium stored in a magazine without the necessity of completely removing said preselected medium from said magazine.

It is another object of the instant invention to provide apparatus for transferring a preselected one of a plurality of media from a container housing said media to a viewing area with the apparatus comprising a frame, said frame having a viewing area associated therewith; first means operatively associated with said frame for moving a container housing a plurality of information containing media between first and second positions which includes said viewing area therebetween; and selection means for retaining a preselected one of said media in said viewing area when said container moves from said second to its first position.

Another object of the instant invention is to provide such an apparatus which includes novel multi-function drive means for moving a magazine supporting carriage between first and second positions, which multi-function drive means includes overtravel capabilities such that additional functions may be performed thereby before and after said carriage moves between its first and second positions.

Yet another object of the instant invention is to provide a novel magazine assembly for storing a plurality of information-bearing media, in the form of microfiche, in which apertured selection tabs are provided on the rear of such fiche, and the fiche are inserted backward so to speak into the magazine with the normally forward wider border regions of the fiche being available to remain interleaved between the plurality of fiche remaining in the magazine when a selected fiche is partially withdrawn for viewing.

Still another object of the instant invention is to provide a method for viewing a selected one of the plurality of media stored in a container therefor, comprising the steps of moving said container from a first position to a second position over a viewing area therebetween; selectively engaging for retention said one of said plurality of media; and moving said container from said second position back to said first position; whereby said selected one of said plurality remains over said viewing area.

Still another object of the instant invention is to provide such a method wherein the length of travel of said container from said second position to said first position is less than the length of said media; whereby the trailing edge of said preselected one of said media will remain interleaved between the remaining ones of said plurality when said container moves between its second and first positions.

Still another object of the instant invention is to provide engagable tabs on the rear portions of the aforementioned media by the process of removing all but a preselected tab area from said rear border portion.

Yet another object of the instant invention is to provide a novel select apparatus for use in the aforementioned viewing apparatus.

Still another object of the instant invention is to provide such a novel selection apparatus which can be actuated in a reset and select mode during the overtravel of the aforementioned multi-function drive means associated with the carriage supporting the information-containing medium.

These and other objects of the instant invention may be further understood by reference to the detailed specification and drawings hereof.

BRIEF DESCRIPTION OF THE SEVERAL VIEWS OF THE DRAWINGS

FIG. 1 is a perspective view of apparatus constructed in accordance with the instant invention and further illustrating a microfiche containing cartridge to be employed in conjunction therewith.

FIG. 2 is an exploded perspective view, partly in section, of the novel selection apparatus hereof and further illustrating the manner in which such selection apparatus cooperates with multi-function drive means employed herein.

FIG. 3 is a top plan view of the apparatus shown in FIG. 1.

FIG. 4 is a bottom plan view of the apparatus shown in FIG. 1, depicting the magazine supporting carriage in its first position and the multi-function drive means associated therewith in its rearmost position.

FIG. 5 is a bottom plan view of the apparatus of FIG. 1, similar to FIG. 4, but illustrating the magazine supporting carriage in its first position and the multi-function drive means associated therewith moving forward prior to the time that the carriage begins its travel between its first and second positions.

FIG. 6 is a plan view of a portion of the apparatus shown in FIG. 1, similar to FIGS. 4 and 5, illustrating the multi-function drive means moving the cartridge supporting carriage to its second position.

FIG. 7 is a partial plan view of the apparatus shown in FIG. 6 illustrating the initial overtravel of the multi-function drive means after the cartridge supporting carriage has been moved to its second position.

FIG. 8 is a partial side view illustrating a preselected medium being retained in the viewing position with the trailing edge thereof remaining interleaved in the remaining plurality of media housed within the cartridge.

FIG. 9 is an elevational view, partly in section, of the apparatus shown in FIG. 4, taken along the arrows 9—9 thereof, and further illustrating the cartridge supporting carriage in its rear, first position.

FIG. 10 is a side elevational view of the apparatus of the instant invention taken along the arrows 10—10 of FIG. 4, once again illustrating the cartridge supporting carriage in its rearmost first position and further illustrating a cam surface of the aforementioned multi-function drive means about to engage a spring biased pressure plate employed for biasingly urging the preselected medium in its viewing position.

FIG. 11 is a side elevational view, partly in section, of the apparatus shown in FIG. 5 taken along the arrows 11—11 thereof, once again illustrating the cartridge supporting carriage situated in its rear, first position, but further illustrating the forward movement of multi-function drive means in such a manner that the aforementioned cam described with respect to FIG. 4 is urging the pressure plate thereof away from its normal position.

FIG. 12 is a side elevational view, partly in section, of the apparatus shown in FIG. 6 and taken along the arrows 12—12 thereof and further illustrating the magazine and carriage therefor positioned in their forwardmost second position, while at the same time the aforementioned multi-function drive means is experiencing initial overtravel movement in the same direction and initiating a reset mode of operation with respect to the selection apparatus shown in FIG. 2.

FIG. 13 is an enlarged partial view of a portion of the selection apparatus shown in FIG. 2 in the position that such apparatus occupies when the remaining apparatus is in the condition illustrated in FIG. 4.

FIG. 14 is a view similar to that shown in FIG. 13 but further illustrating the cartridge and cartridge supporting carriage approaching their forward, second position.

FIG. 15 is a view similar to that shown in FIG. 14, but additionally illustrates the cartridge resting in its second position, while the cam surface of the multi-function drive means is initiating the reset operation.

FIG. 16 is a view similar to that shown in FIG. 15, but illustrating the completion of the reset mode of operation by which a previously viewed media is disengaged.

FIG. 21 is an enlarged side elevational view, partly in section, illustrating the medium containing cartridge supported on its associated carriage while such carriage continues to maintain the aforementioned pressure plate in a position removed from its normally biased position.

FIG. 22 illustrates the condition of the apparatus when the carriage has returned to its rearmost first position and the pressure plate has returned to its normally biased position to sandwich the selected medium up against the undersurface of the frame of the apparatus in its viewing area.

FIG. 23 is a view similar to FIG. 22, but further illustrating the manner in which the medium containing cartridge may be rotated about the rear edge of the carriage.

FIG. 24 is a rear view of the apparatus shown in FIG. 1.

DETAILED DESCRIPTION

Figure 17:
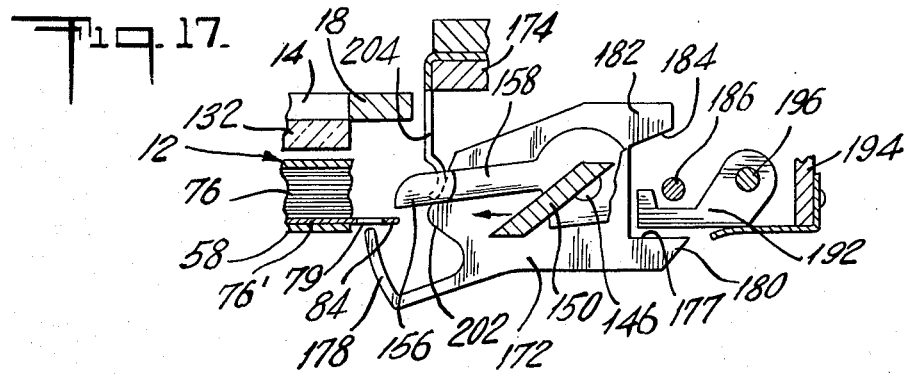
FIG. 17 is a view similar to FIGS. 13 through 16 showing the cartridge in its forward, second position, the reset operation already having taken place, and the aforementioned multi-function drive means beginning its reverse travel to initiate the select mode before the cartridge begins its rearward travel back to its first position.

Turning to the Figures, wherein like numerals designate like elements, there is shown in FIG. 1 apparatus 10 for transferring a selected one of a plurality of information-bearing media such as microfiche from a magazine 12 therefor to a viewing area 14 provided in a frame designated 16. As best seen perhaps in FIG. 1 and FIG. 24, the frame includes a generally planar member 18 provided with depending support plates 20 in which are carried opposite ends 22 of shafts 24 which pass freely through upstanding trunions 26 carried on a plate 28. As best seen in FIG. 24, extending from the lower surface of plate 28 are a pair of trunions 30 freely slidable with respect to a fixed shaft 32 carried at opposite ends in fixed standards 34 upstanding from the lower platform 36.

To be appreciated thusfar in the description is the fact that the entire frame 16 may thus be slid forward and backward in the direction of double-headed arrow 38 (by virtue of the sliding arrangement between shaft 24 and trunions 26) while at the same time, the frame 16 can be moved side to side in the direction of double-headed arrow 40 (by virtue of the sliding engagement between shaft 32 and trunions 30). Thus, with a preselected medium such as a microfiche retained in the viewing area 14 in the manner to be further described, the entire frame and microfiche can be moved in transverse directions to preposition a selected row and column frame of such fiche with respect to a light soure positioned therebeneath. In this connection, in addition to a light source, it will be appreciated that an overall microfiche film viewer incorporating the apparatus 10 hereof, would also include appropriate lenses, reflecting surfaces, screens, etc., well known in the art and forming no part of the instant invention.

As best seen in FIGS. 1, 4, 5 and 6, cartridge 12 is basically a five-sided container having top and bottom surfaces 42 and 44, respectively, side surfaces 46 and 48, respectively, and a rear wall 50. Side surface 46 includes a generally L-shaped outstanding projection 52 which defines an aligning receptacle 54 which receives an upstanding alignment projection 56 provided on carriage 58 when the magazine is inserted into the apparatus 10 by being slid forward on carriage surfaces 58. To lock the cartridge 12 in place on carriage 58, there is provided on carriage 58 a rotating bell crank-like latch 60 provided with an overcenter spring arrangement 62 (see FIG. 5). When the cartridge 12 is initially inserted on the carriage 58, the leading edge 64 of the L-shaped projection 52 initially engages leg 66 of the latch arrangement 60 to rotate the entire latch counterclockwise around the pivotal axis 68 upstanding from the carriage 58. At this point, the spring 62 urges the other leg 68 of the latch arrangement 60 against the rear of the L-shaped projection 52 to lock the cartridge in place. Of course, on retraction of the cartridge 12, it is the rear edge of the L-shaped projection 52 which rotates the blocking leg 68 out of the path of motion of the cartridge 12 being withdrawn such that the latch is returned to its initial condition ready to accept the next cartridge (see FIG. 4).

The opposite side wall 48 of the cartridge 12 carries a movable blocking portion 70 hingedly secured thereto at 72. As best seen in FIG. 4, the blocking portion includes a lip 74 which normally retains all of the fiche 76 within the cartridge 12, for example, during transport between the apparatus 10 and the location (not shown) where a plurality of such cartridges 12 are normally stored. However, when the cartridge 12 is inserted into the apparatus 10 by being slid along the carriage 58, an outwardly angled portion 78 of the blocking member 70 is cammed further outwardly by an upstanding camming projection 80 provided on the surface of the carriage 58 to move the retaining lip 74 out of the path of movement of the fiche 76 such that a selected fiche many be withdrawn from the carriage 12 in a manner to be further described. The blocking function of member 70 may be best seen in FIG. 4, whereas the manner in which the camming projection 80 provided on the carriage 58 cams the portion 70 into a non-blocking position is best illustrated in FIG. 6.

Once the magazine 12 has been inserted in the aforedescribed manner onto the carriage 58, in accordance with the invention, it is necessary to move the carriage 58 together with the magazine forward from its rearward first position shown in FIG. 5 to its second forward position shown in FIGS. 6 and 7. It should be noted that in passing between its first and second positions, the magazine 12 passes the viewing area 14 (FIG. 1). In a manner to be further described, the selection means 82 thereafter engages the aperture tab 84 of the preselected fiche 76' which one wishes to view. Thus, when the magazine 12 carried by the carriage 58 is returned to its first position, the preselected fiche 76' will be retained in the viewing area 14 in the manner shown in FIG. 5. To be described in greater detail is the manner in which the trailing edge 86 of the preselected fiche 76' remains interleaved between the remaining ones of the plurality of fiche 76 after the magazine 12 has been moved back to its first position (see FIG. 8).

With reference to FIG. 4, for effecting the aforedescribed movements, the carriage 58 is provided on opposite ends thereof with support blocks 88 and 90. Support block 88 includes a longitudinal aperture 92 therethrough by means of which support block 88 is freely slidable on fixed shaft 94 fixed between support plates 20. In like fashion, carriage support block 90 includes first and second extensions 96 and 98 having longitudinal passageways 100 and 102 therethrough by which the support block 90 is freely slidable along the shaft 104 secured between depending support plates 20. In this manner, by means of the multi-function drive member 106 to be described immediately below, the cartridge supporting carriage 58 can be moved between its aforementioned first and second positions.

The multi-function drive member 106 has an internally threaded longitudinal passageway 108 therethrough which threadably engages externally threaded lead screw 110. With reference to FIG. 4, the leftmost end 112 of lead screw 110 is of reduced diameter and freely mounted for rotation in support plate 20. The rightmost end 114 of lead screw 110 is similarly reduced in diameter and passes through support plate 20 for fixed engagement to gear 116 driven by cooperating gear 118 fixed on the output shaft of reversible motor 120. Thus, rotation of the lead screw 110 in a first direction caused by appropriate energization of the motor 120 will cause the multi-function drive member 106 to travel in a first direction (for example, toward the front of the apparatus 10), whereas reverse energization of the motor 120 and corresponding reverse rotation of the lead screw 110 will cause the multi-function drive member 106 to travel toward the rear of the apparatus 10.

In further accord with the invention, an overtravel cooperative arrangement is established between the multi-function drive member 106 and the carriage 58 in order to permit the multi-function drive member 106 to perform functions in addition to moving the carriage between its first and second position at times both before and after the carriage 58 has been moved between its first and second position. To effectuate such overtravel arrangement, it will be seen in FIGS. 4 through 7 that a first compressible spring 122 is centered about shaft 104 and disposed intermediate first extension 96 of block 90 and an intermediate smaller extension 124 thereof. In like fashion, a second compressible spring 126 is centered about shaft 104 and disposed between second extension 98 of the block 90 and the intermediate extension 124 thereof. Multi-function drive member 106 includes an inwardly directed driving extension 128 which engages compressible spring 122 (FIGS. 5, 6 and 7) or compressible spring 126 (FIG. 4) depending on the direction of travel of multi-function drive member 106, in turn dependent upon the direction of energization of motor 120 in the manner aforedescribed.

Consider, for example, the status of the apparatus as depicted in FIG. 4, the start position. The carriage 58 is in its rearmost first position as established by the engagement of the second extension 98 of the support block 90 abutting an adjustable screw threaded stop 130 passing through depending support plate 20. Multi-function drive member 106 is similarly in its rearmost position compressing second compressible spring 126. Assuming now that the motor 120 is energized in the appropriate direction, rotation of the lead screw 110 causes the multi-function drive member 106 to begin traveling toward the right as viewed in FIG. 4. This condition is depicted in FIG. 5 wherein it can be seen that the drive portion 128 of multi-function drive member 106 has disengaged compressible spring 126, now expanded to its full length, and begins to engage and compress first compressible spring 122. However, even though the multi-function drive member 106 has experienced this initial travel, it can be seen that the carriage 58 supporting the magazine 12 has not yet begun to travel from its first rearward position toward the front of the apparatus 10.

The function performed by the multi-function drive member 106 during its initial travel before the carriage 58 begins to move from its first rearward position can best be understood with reference to the sequence of operations shown in FIGS. 9 through 11. Initially, it should be noted that beneath the viewing area 14 the frame 16 carries a fixed upper glass platen 132. Additionally, beneath upper glass platen 132 is a lower glass pressure plate 134 loosely carried by screw threaded pins 136 on the arms 138 of a generally U-shaped plate 140 secured by screws 142 to the undersurface of a pair of stop blocks 144 freely rotatable about a main drive shaft 146 of the selection apparatus 82 to be described in greater detail. (See FIGS. 2 and 4). A spring 148 normally biases U-shaped plate 140 clockwise about main drive shaft 146 such that the arms 138 normally maintain lower pressure plate 134 against the undersurface of upper glass platen plate 132 to sandwich the selected fiche 76' therebetween in the manner depicted also in FIG. 23.

As seen in FIG. 2, the multi-function drive member 106 also carries a multi-function cam surface 150 which, in addition to performing other functions in the selection apparatus, also functions to engage the pressure plate supporting arm 138 to drive same out of the path of travel of the carriage 58 during that initial travel of the multi-function drive member 106 before the carriage 58 begins to move between its first and second positions. Thus, as seen in FIGS. 4 and 10, with the multi-function drive member 106 in its most rearward position in which the drive portion 128 thereof is compressing second compressible spring 126, the cam surface 150 of multi-function drive member 106 is not engaging the arm 138 carrying transparent pressure plate 134. However, during the initial travel of the multi-function drive means to the right as viewed in FIG. 11, (before the carriage 58 has experienced any motion) the multi-function cam surface 150 engages arm 138 and begins to drive same counterclockwise about main drive shaft 146 against the bias of compression spring 148. Of course, it should be appreciated that the pressure plate 134 must indeed by urged out of the path of movement of the carriage 58 since during the selection process, the carriage 58 with the magazine 12 thereon is going to be traveling beneath the viewing area 14 until such time as it is fully withdrawn to the starting position illustrated in FIGS. 4 and 9.

Continuing now with the overall operation, by virtue of the engagement of the drive portion 128 of multi-function drive member 106 against spring 122, it will be seen that continued forward motion of the multi-function drive member 106 will now cause the cartridge bearing carriage 58 to be moved between its first position illustrated in FIG. 5 and its second position illustrated in FIG. 6. It should be noted that the second, rest position for the carriage 58 and cartridge 12 is established when the leading edge 152 of the cartridge 12 abuts the aforementioned stop blocks 144 which support the plate 140 in the manner previously described (see FIGS. 6 and 12). Also, it should be noted that carriage 58 carries a dependent plate cam 154 which also engages pressure plate 134 (FIG. 12) to maintain the pressure plate 134 away from the magazine 12 when the magazine 12 is traveling between its first and second position.

Although the magazine bearing carriage 58 has now reached its second position, illustrated in FIG. 6, the aforedescribed overtravel arrangement now permits the multi-function drive means to continue traveling to the right as viewed in FIG. 6. This condition is illustrated in FIG. 7 in which the compressibility of the spring 122 allows the multi-function drive member 106 to continue rightward movement without effecting further movement of the carriage 12.

As will be explained in greater detail in connection with the detailed description of the selection apparatus, it is noted at this point, that during such overtravel motion between FIG. 6 and FIG. 7, the multi-function cam surface 150 of the multi-function drive member 106 engages a cam surface 156 of selector activating arm 158 fixedly carried by main drive shaft 146 described previously (see FIG. 2). This sequence is shown in FIGS. 15 and 16 wherein the cam surface 150 engages, operates and then passes the cam 156 provided on the selector activating arm 158 which is normally biased to return to its home position illustrated in FIGS. 13 and 14 by virtue of spring 160 shown also in FIG. 2. As will be described in greater detail, such counterclockwise rotation of arm 158 causes a resetting of the selection apparatus 82.

As best seen perhaps in FIG. 2, multi-function drive member 106 also includes an outwardly extending projection 162 which cooperates with microswitches 164 and 166 supported on frame 16 by generally L-shaped members 168 and 170, respectively, (see FIG. 1). With reference to FIG. 7, rightward overtravel of multi-function drive member 106 continues until projection 162 thereof engages microswitch 164 which through appropriate circuitry (not shown) reverses the direction of energization of motor 120 to begin rotating lead screw 110 in the opposite direction to cause multi-function drive member 106 to begin traveling back toward the left as viewed in FIGS. 6 and 7. Of course, during the initial leftward travel of the multi-function drive member 106, the drive portion 128 has not as yet engaged the second compressible spring 126 such that the carriage 58 and magazine 12 carried thereby have not yet begun traveling from their second position back toward their first position at the rear of the apparatus 10.

Figure 18:
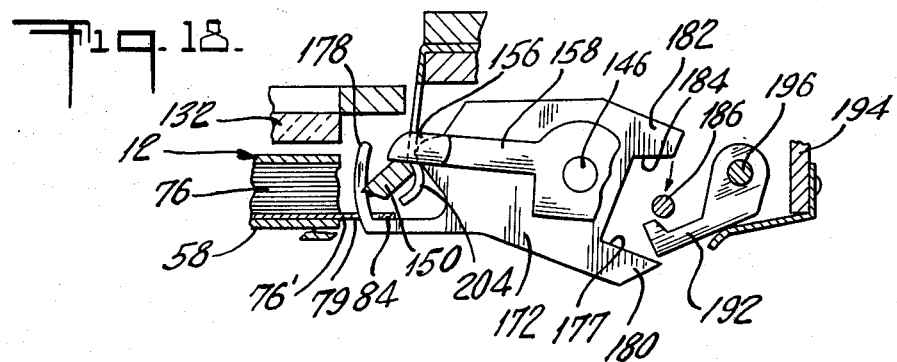
FIG. 18 is a view similar to that shown in FIGS. 13 through 17 in which the cam associated with the multi-function drive means has initiated the select mode (in accordance with the medium which has been selected in the select apparatus) before the cartridge begins moving back to its first position.
Figure 19:
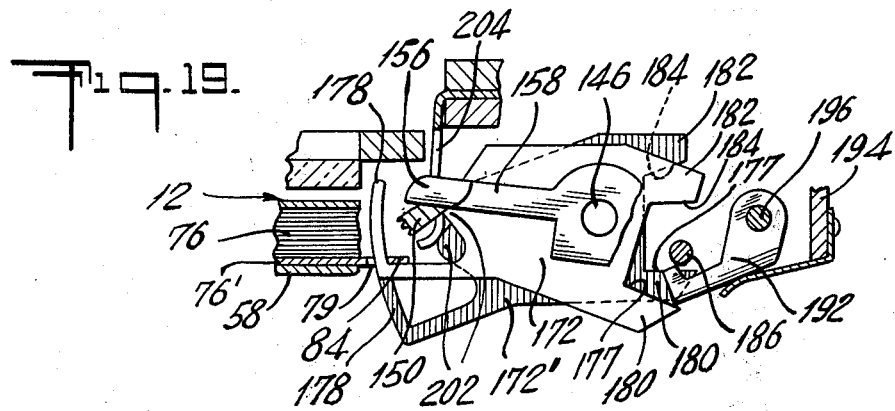
FIG. 19 is a view similar to FIG. 18 but further depicting in superimposed form, the two possible positions of the individual keys of the selector mechanism hereof.
Figure 20:
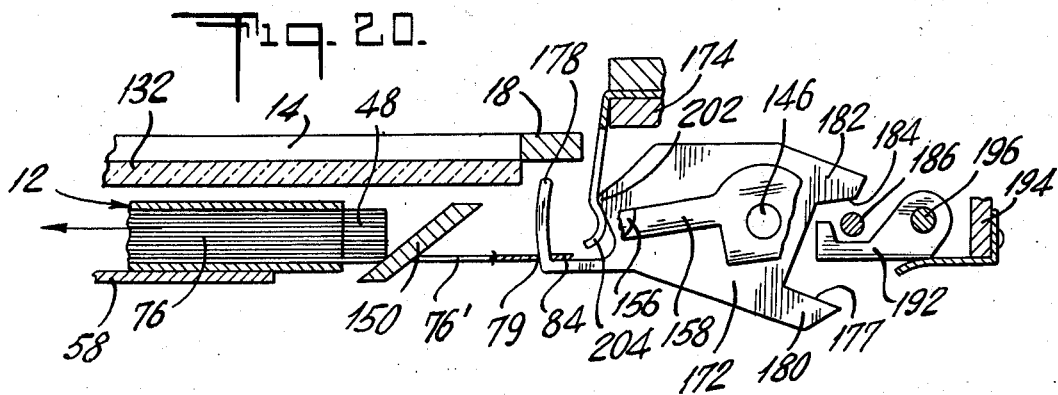
FIG. 20 is a view similar to FIGS. 13 through 19, but additionally illustrating the return of the media containing cartridge back toward its initial rearmost first position.

However, during such initial travel of the multi-function drive member 106 to the left, the cam surface 150 thereof once again engages the cam surface 156 of the select activating arm 158. This sequence is shown in FIGS. 17 through 19 in which the cam surface 150 engages cam surface 156, lifts same to rotate arm 158 clockwise around main shaft 146 and then passes same, it being understood that the aforementioned spring 160 thereafter functions to return the arm 158 to its home position illustrated in FIGS. 17 and 20. As will be further described in connection with the detailed operation of the select apparatus 82, it is the clockwise rotation of arm 158 that causes the select apparatus 82 to engage the preselected apertured tab 84 of the selected fiche 76' during the initial leftward travel of the multi-function drive member 106 which takes place before the carriage 58 begins moving from its second position shown in FIG. 6 back to its initial first position illustrated in FIG. 5.

With continued leftward movement of the multi-function drive member 106, the driving portion 128 thereof now engages the second compressible spring 126 such that continued motion of the multi-function drive member 106 causes the carriage 58 and magazine 12 carried thereby to be returned toward its first starting position. As suggested previously, carriage 58 and magazine 12 continue moving to the left until the extension 98 of block 90 of carriage 58 engages the stop 130. However, by virtue of the compressibility of the second spring 126, multi-function drive member 106 is permitted to continue its leftward motion such that its multi-function cam 150 disengages itself from the arm 138 such that under the influence of compression spring 148, the lower pressure plate 134 rotates clockwise around main shaft 146 to biasingly urge the selected fiche 76' against the undersurface of the upper glass plate 132 in the manner shown in FIG. 23. The leftward overtravel of the multi-function drive member 106 is illustrated in FIG. 4, it being understood that at this point in time, the outwardly projecting surface 162 of the multi-function drive member 106 now engages the second microswitch 166 to deactivate the motor 120 and at the same time reset its mode of operation such that upon subsequent activation it will begin rotating the lead screw in the opposite direction to reinstitute the aforedescribed process.

Summarizing this aspect of the invention, the overtravel arrangement established between the multi-function drive means and the magazine supporting carriage permits the multi-function drive means to initially urge the pressure plate out of the path of motion of the carriage before the carriage begins to move between its first and second position; permits the multi-function drive member to operate the selection apparatus in the reset mode during overtravel of the multi-function drive member after the carriage has been moved between its first and second position; permits the multi-function drive member to operate the selection apparatus in its selection mode during the initial travel of the multi-function drive member in the reverse direction before the carriage begins its motion between its second and first position; and, finally, permits the multi-function drive member to disengage itself from the biased pressure plate arrangement which urges the selected fiche into the viewing position after the cartridge bearing carriage has moved back to its first position.

Considering now the details of the selection apparatus 82, it will be seen from FIGS. 2 through 7, that the selection apparatus 82 includes a plurality of select keys 172 freely rotatable about main drive shaft 146. The keys 172 are maintained in spaced-apart aligned relationship by a comb-like structure 174 having depending legs 176 interposed between the respective keys 172. Each of the keys includes a rearwardly extending select-activating surface 177 and a forwardly extending picker arm extension 178 which will be rotated between a reset position illustrated in FIG. 17 and a select position illustrated in FIG. 18 whenever the corresponding select-activating surface 177 is depressed. It will be appreciated that when a selected key 172 is rotated clockwise such that the picker arm extension 178 thereof moves from its reset position of FIG. 17 to its select position of FIG. 18, that the picker arm extension will pass through the apertured tab 84 of the fiche 76' which has been selected by virtue of the selection of the appropriate key 172 in a manner to be immediately described.

As can be best seen in FIG. 2, the rear portion of each selector key 172 is bifurcated in nature to form a generally U-shaped configuration having a first leg 180 including the select-activating surface 177 and a second leg 182 having a reset activating surface 184. It will be appreciated that when the reset activating surface 184 is engaged to rotate the selector key 172 counterclockwise about shaft 146, the picker arm extension 178 will move from its select mode illustrated in FIG. 18 back to its reset position illustrated in FIG. 17 and in so moving will pass out of any apertured tab 84 positioned thereabout.

To actuate the keys, there is provided an actuating shaft 186 carried by rocker arms 188 fixedly secured to main drive shaft 146 which drive shaft is rotatably carried by trunions 190 secured on the undersurface of planar member 18 of the frame assembly 16.

It was noted previously in the description that during the rightward overtravel of the multi-function drive means 106, the cam surface 150 thereof actuated the selector activating arm 158 of the selection apparatus 82 to operate same in a reset mode of operation. To explain this further, let it be assumed that by the selection mode of operation to be described subsequently, a previously preselected selector key 172 was in the select position of FIGS. 13 and 14 in which its associated picker arm extension 178 was passing through the apertured tab 84 of the fiche 76' which had already been viewed. With reference to FIG. 15, as the cam surface 150 of the multi-function drive 106 overtravels to the right and depresses the cam surface 156 of the select activating arm 158, the arm 158 will rotate counterclockwise as shown in FIGS. 15 and 16 to rotate the main drive shaft 146 counterclockwise, thereby causing the rocker arms 188 and actuating shaft 186 carried thereby to similarly rotate counterclockwise and engage the reset activating surface 184 carried on the leg 182 of the key 172. This is shown taking place in FIGS. 15 and 16 wherein it can also be seen that the selector key 172 has been rotated counterclockwise to withdraw the corresponding picker arm extension 178 from the apertured tab 84 of the fiche 76' which had just previously been viewed by the user of the apparatus 10. As also noted previously, and as suggested in FIG. 17, the return spring 160 will return the arm 158 to its home position.

As also noted previously, it is during the initial travel of the multi-function drive member 106 back toward the left (before the carriage 58 begins moving back to its first position) that the cam surface 150 thereof engages the surface 156 of the arm 158 in the opposite direction to operate the select apparatus 82 in the select mode. This is further explained as follows. As the rear surface 190 of surface 150 engages surface 156 of arm 158, arm 158 rotates clockwise as shown in FIGS. 18 and 19 causing corresponding clockwise rotation of main drive shaft 146, clockwise rotation of rocker arm 188 and corresponding clockwise rotation of actuating shaft 186. It should be noted, however, from FIG. 19, that the maximum clockwise rotation of actuating shaft 186 is insufficient to engage the select activating surfaces 177 of all selector keys 172 and that, in fact, the only selector key 172 which will be rotated clockwise will be that selector key 172 which has positioned between its select activating surface 177 and the shaft 186 the selector arm 192 of a selector assembly 194. As best seen in FIG. 2, the selector assembly 194 is slidable along a fixed shaft 196 carried by the aforementioned trunions 190 and selectively positionable along shaft 196 by virtue of rack and pinion arrangement 198 energizable by a stepping motor 200 (see FIG. 4).

Thus, to select a preselected fiche 76' for viewing, it is only necessary to energize motor 200 to move selector arm 192 between the actuating shaft 186 and the select activating surface 177 of the key 172 which when rotated will pick through the associated apertured tab 84 of the fiche 76' to be viewed. As described above, when the select activating arm 158 is rotated clockwise by the rearwardly traveling cam surface 150 of the multi-function drive member 106, the space between the actuating shaft 186 and the appropriate select activating surface 177 of the selected key 172 will be filled in by the selector arm 192 such that rotation of the shaft 186 will rotate the selector key 172 clockwise to pick and retain the preselected fiche 76' in the viewing area after the carriage with the magazine thereon returns to its initial first position. (As noted, FIG. 19 shows one preselected key 172 selected in accordance with the position of the selector arm 192 rotated to its select position while the remaining keys 172' shown with the shading, remain in their reset mode).

As is perhaps best illustrated in FIG. 5, it will be seen that the width of the selector arm 92 (designated by the Dimension W-192) is slightly less than the Dimension between the keys 172. In this manner, the entire width of the selector arm 92 is available for engagement with the preselected key 172 such that precise positioning of selector assembly 194 along the shaft 196 is not required. It should also be noted that the selector keys include a forwardly extending protuberance 202 which cooperates with depending spring biased detent fingers 204 (see FIGS. 2 and 13 through 20) to maintain the selector keys 172 in their reset or select positions.

From the above, it should be further appreciated that so far as the operation of the apparatus is concerned, it makes no difference when the selector assembly 194 is moved along shaft 192 to preposition the selector arm 192 above the respective select activating surface 177 of the appropriate selector key 172 to be actuated. For example, assume that the operator had just placed a new magazine on the carriage 58 and selected the fiche 76' he wished to view by appropriate operation of a push button or other mechanism (not shown) which would energize stepping motor 200 to move the selector assembly 194 with its selector arm 192 to the appropriate position with respect to the selector key 172 which will pick the fiche he wishes to view. Since initially all selector keys 172 are in their reset position illustrated in FIG. 16, the initial reset mode of operation (which will occur when the cam surface 150 of the multi-function drive member 106 rotates the select activating arm 158 counterclockwise) will have no effect upon any of the keys 172. Of course, upon the leftward travel of the cam surface 150 of multi-function drive member 106, the clockwise rotation of select activating arm 158 will cause the clockwise rotation of the selector key 172 which has the selector arm 192 positioned above its respective select activating surface 177. Thus, when the carriage 58 with the magazine 12 thereon retracts to its first position, the retained fiche 76' which has been "hooked" by the picker arm extension of the rotated selector key 172 will remain in the viewing position, urged against the upper plate 132 by the pressure plate 134 and be capable of being viewed.

Now, let it be assumed that the operator of the viewer wishes to view a different microfiche within the same magazine 12. Once again, he activates appropriate selection mechanism such as a push button key board or other equivalent device (not shown) to cause the energization of stepping motor 200 and the corresponding lateral movement of selector assembly 194 such that selection lever 192 will move from the previously selected key 172 to the new key 172 corresponding to the new microfiche 76' which the operator wishes to view. In this situation, after the carriage has once again moved from its first to its second position, and the multi-function drive member continues its overtravel, the corresponding counter-clockwise rotation of select activating arm 158 will cause the resetting of the previously employed selector key 172 while the rearward travel of the multi-function drive member 106 will cause the clockwise rotation of the select activating arm 158 and the rotation of the new selector key 172 from its reset to select position in which the corresponding picker arm extension 178 will pass through the apertured tab 84 of the new fiche 76' which has been selected for viewing.

Assuming now that the operator is finished viewing fiche stored in magazine 12, all he need do is energize the motor 200 to move the selector arm 192 out from engagement with any of the selector keys 172 (in the manner depicted in FIG. 4). In this manner, during the reset mode of operation the last used selector key 172 will be returned to its reset position and the clockwise rotation of arm 158 (which will occur during withdrawal) will not activate any new selector key 172 by virtue of the fact that lever 192 is not interposed between the actuating shaft 186 and the select activating surface 177 of any of the keys 172. Thus, with no apertured tab engaged, the magazine 12 will return to its first position with all of the fiche, including the last viewed fiche, in their properly stored position, the entire magazine can be removed from the carriage 58.

Figure 25:
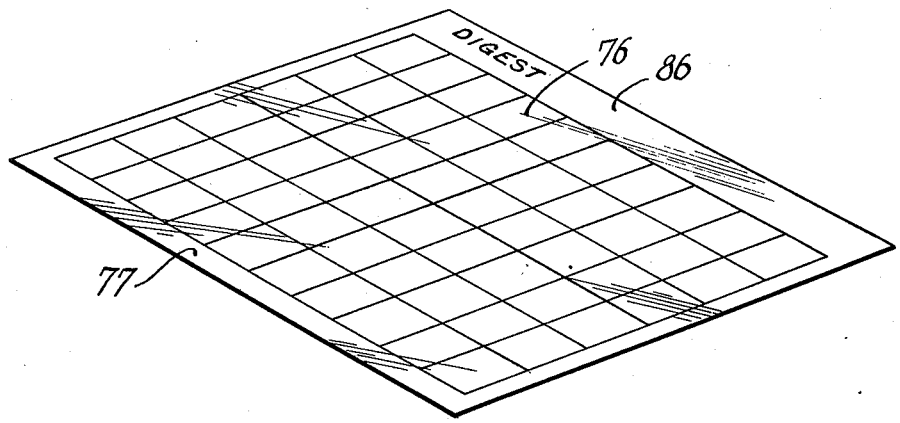
FIG. 25 is a perspective of a conventional microfiche.

Turning to FIG. 25, there is shown a conventional fiche 76 which includes relatively narrow trailing border area 77 and a relatively wider title border area 86. In accordance with another aspect of the present invention, the apertured tab regions 84 employed herein are formed by removing all but the selected tab area 84 from the narrow trailing border portion 77 in the manner shown in FIG. 26 hereof. This step is performed in a punch press operation having cutting dies to remove the unwanted area and a punch to provide the aperture 79 in the tab region 84 which remains. This is a materially simpler process than adding a tab to the fiche whose dimensions are outlined in FIG. 25. Additionally, by simply laterally varying the position of the border region 77 in the punch press described above, the tabs 84 can be produced laterally offset from one another on the stacked fiche 76 stored in the magazine 12 in the manner illustrated in FIGS. 1, 4 and 5.

Figure 26:
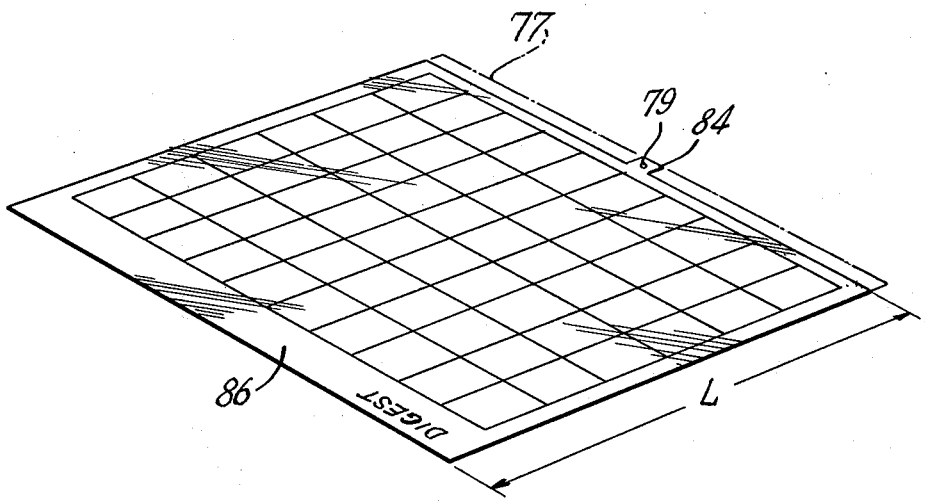
FIG. 26 is a perspective view of the fiche shown in FIG. 25 modified in accordance with the instant invention.

In further accord with the instant invention, and as suggested in FIGS. 4, 5 and 26, the fiche 76 are inserted in the magazine 12 in a reverse direction, that is, with the wider title portion 86 thereof to the rear of the magazine. In this manner, and by choosing the distance between the first and second positions of the carriage and magazine to be less than the length of the fiche designated L in FIG. 26, the wider border area 86 of the selected fiche remains interleaved between the remaining ones of the fiche when the selected fiche 76' remains in the viewing area and the carriage 58 with the magazine 12 returns to its first position. By providing that the larger border area 86 remain interleaved in the magazine the film portion of the fiche 76 remains unobstructed for viewing. Moreover, as noted previously, because the border area 86 remains interleaved in the magazine, there is no difficulty as is experienced in the prior art of attempting to insert the viewed fiche back into the carriage 12 after viewing thereof is completed.

Considering FIG. 22, it will be seen that when the pressure plate 134 biasingly urges the selected fiche 76' against the undersurface of the upper glass platen 132, there is a tendency for the magazine 12 to rotate counterclockwise. In accordance with the instant invention, the length of carriage 58 designated by the dimensional arrows C in FIG. 22 is so chosen relative to the length of the magazine 12 that its rear trailing edge 206 terminates at about midway along the length of the magazine 12, thus permitting the magazine 12 to rotate around the trailing edge 206 of carriage 58.

Also, as suggested in FIG. 23, should the preselected fiche occupy a relatively low position in the magazine 12, there is even a greater tendency for the biased pressure plate 134 to urge the magazine 12 counterclockwise about the trailing edge 206 of the carriage 58. To accommodate such motion, the planar member 18 of the frame 16 includes an accommodation portion 206 pivotally secured to the planar member 18 by hinge 210 (see also FIG. 1).

Although this invention has been described with respect to its preferred embodiment, it should be understood that many variations and modifications will now be obvious to those skilled in the art, and it is preferred, therefore, that the scope of the invention be limited, not by the specific disclosure herein, only by the appended claims.

What is claimed is:

1. Apparatus for transferring a preselected one of a plurality of media from a container housing said media to a viewing area; said apparatus comprising:
a frame, said frame having a viewing area associated therewith;
first means including a carriage operatively associated with said frame for moving a container housing a plurality of information containing media between first and second positions which includes said viewing area therebetween and a multiple-function drive means for moving said carriage between said first and second positions;
selection means including selector-activating means for retaining a preselected one of said media in said viewing area when said container moves from said second to its first position without completely removing the trailing edge of said preselected one of said media from said container, and
first over-travel means associated with said carriage and said multi-function drive means for permitting said multi-function drive means to experience initial travel in the direction of travel of said carriage between its first and second positions before said carriage begins to move between its first and second positions, and for permitting said multi-function drive means to continue moving after said carriage has been moved between its first and second positions.

2. The apparatus of claim 1 wherein said first over-travel means comprises a compressible spring.

3. The apparatus of claim 1 wherein said selector activating means is operated by said multi-function drive means in a reset mode of operation after said carriage has been moved between its first and second position.

4. The apparatus of claim 3 and further including reversible motive means for moving and multi-function drive means in opposite directions.

5. The apparatus of claim 4 and further including first switch means mounted on said frame and engaged by said multi-function drive means after a predetermined extent of travel of said multi-function drive means after said carriage has moved to its second position for reversing the operation of said motive means.

6. The apparatus of claim 1 and further including a pressure plate movably secured to said frame for biasingly maintaining said preselected one of said media in said viewing area.

7. The apparatus of claim 6 wherein said multi-function drive means engages said pressure plate and drives same out of the path of movement of said carriage during the initial travel of said multi-function drive means before said carriage begins to move between its first and second position.

8. The apparatus of claim 7 wherein said selector activating means is operated by said multi-function drive means in a reset mode of operation after said carriage has been moved between its first and second position.

9. The apparatus of claim 8 and further including a pressure plate movably secured to said frame for biasingly maintaining said preselected one of said media in said viewing area, and wherein said multi-function drive means disengages said pressure plate and allows it to return toward its biased position after said carriage has been moved between its second and first positions.

10. The apparatus of claim 9 and further including reversible motive means for moving and multi-function drive means in opposite directions and further including second switch means mounted on said frame and engaged by said multi-function drive means after a predetermined extent of travel of said multi-function drive means after said carriage has moved to its first position for reversing and deactivating the operation of said motive means.

11. The apparatus of claim 9 wherein said multi-function drive means operates said selector activating means in a select mode of operation during the initial travel of said multi-function drive means before said carriage begins to move between its second and first position.

12. The apparatus of claim 9 wherein said frame includes a planar member against the under surface of which said pressure plate is biasingly urged; said planar member including a pivotally mounted accommodation portion movable out of the plane of said planar member to accommodate rotational movement of said container about the rear edge of said carriage when said pressure plate urges said preselected one of said media against the under surface of said planar member.

13. The apparatus of claim 12 and further including a support base; said frame being movably mounted on said support base for motion in transverse directions with respect thereto.

14. The apparatus of claim 12 wherein said container has a predetermined length; the distance between said first and second positions of said container and carriage respectively is less than the predetermined length of said container; whereby the trailing edge of said preselected one of said media will remain interleaved between remaining ones of said plurality of media when said carriage moves said container between its second and first position and said selection means retains said preselected one of said media in said viewing area.

15. The apparatus of claim 8 and further including second overtravel means associated with said carriage and said multi-function drive means for permitting said multi-function drive means to experience initial travel in the direction of travel of said carriage between its second and first position before said carriage begins to move between its second and first position and for permitting said multi-function drive means to continue moving after said carriage has been moved between its second and first positions; and wherein said multi-function drive means operates said selector activating means in a select mode of operation during the initial travel of said multi-function drive means before said carriage begins to move between its second and first position; wherein said multi-function drive means disengages said pressure plate and allows it to return toward its biased position after said carriage has been moved between its second and first positions.

16. The apparatus of claim 15 and further including reversible motive means for moving said multi-function drive means in opposite directions; and further including first switch means mounted on said frame and engaged by said multi-function drive means after a predetermined extent of travel of said multi-function drive means after said carriage has moved to its second position for reversing the operation of said motive means; and further including second switch means mounted on said frame and engaged by said multi-function drive means after a predetermined extent of travel of said multi-function drive means after said carriage has moved to its first position for reversing and deactivating the operation of said motive means.

17. The apparatus of claim 6 wherein said frame includes a planar member against the under surface of which said pressure plate is biasingly urged; said planar member including a pivotally mounted accommodation portion movable out of the plane of said planar member to accommodate rotational movement of said container about the rear edge of said carriage when said pressure plate urges said preselected one of said media against the under surface of said planar member.

18. The apparatus of claim 1 and further including second overtravel means associated with said carriage and said multi-function drive means for permitting said multi-function drive means to experience initial travel in the direction of travel of said carriage between its second and first position before said carriage begins to move between its second and first position and for permitting said multi-function drive means to continue moving after said carriage has been moved between its second and first positions.

19. The apparatus of claim 18 wherein said second overtravel means comprises a compressible spring.

20. The apparatus of claim 18 and further including a support base; said frame being movably mounted on said support base for motion in transverse directions with respect thereto.

21. The apparatus of claim 18 wherein said container has a predetermined length; the distance between said first and second positions of said container and carriage respectively is less than the predetermined length of said container; whereby the trailing edge of said preselected one of said media will remain interleaved between remaining ones of said plurality of media when said carriage moves said container between its second and first position and said selection means retains said preselected one of said media in said viewing area.

22. The apparatus of claim 18 wherein said first overtravel means comprises a compressible spring, wherein said second overtravel means comprises a compressible spring; wherein said carriage includes sidewardly extending first and second extensions; said compressible spring being interposed between a respective one of said first and second extensions and a carriage drive extension of said multi-function drive means.

23. The apparatus of claim 22 wherein said carriage is freely, slidably mounted for movement between its first and second positions on a pair of shafts fixedly secured to said frame; one of said shafts passing freely through said first and second extensions; said one of said shafts passing through said compressible springs.

24. The apparatus of claim 18 wherein said multi-function drive means operates said selector activating means in a select mode of operation during the initial travel of said multi-function drive means before said carriage begins to move between its second and first position.

25. The apparatus of claim 24 wherein said selection means includes
a plurality of selector keys rotatably supported in spaced aligned relationship, each of said keys including a rearwardly extending select-activating surface and a forwardly extending picker-arm extension which will be rotated between a reset and select position in response to said select-activating surface being depressed;
actuating means normally located at a first position a first predetermined distance above the select-activating surfaces of each of said keys, said activating means being movable between said first position and a second position a second predetermined distance above said select-activating surfaces; and
a selector selectively interposable between said actuating means and a preselected one of said select-activating surfaces to be depressed in response to said actuating means moving between its first and second position; and
wherein said selector activating means moves said actuating means between its first and second position in response to said selector activating means being engaged and operated in said select mode of operation by said multi-function drive means during the initial travel of said multi-function drive means before said carriage begins to move between its second and first position.

26. The apparatus of claim 25 wherein said selector activating means is operated by said multi-function drive means in a reset mode of operation after said carriage has been moved between its first and second position; wherein each of said keys includes a rearwardly extending reset-activating surface which when engaged causes its corresponding picker arm extension to be rotated between its select and reset positions; and wherein said first position of said actuating means is spaced from said reset-activating surfaces of said keys; and wherein said activating means is additionally movable between its first position and a third position which engages the reset activating surface of any of said keys which happen to be in said select position to rotate same to its reset position; and wherein said selector activating means moves said actuating means between its first and third position in response to said selector activating means being engaged and operated in said reset mode of operation by said multi-function drive means after said carriage has been moved between its first and second position.

27. The apparatus of claim 26 wherein the rear portion of said keys are of bifurcated configuration having first and second leg portions associated therewith, said first leg including said select-activating surface, said second leg including said reset-activating surface.

28. The apparatus of claim 27 wherein said actuating means comprises an actuator shaft passing between the first and second legs of said keys.

29. The apparatus of claim 28 wherein said actuator shaft is carried by rocker arms fixedly secured to a main drive shaft.

30. The apparatus of claim 29 wherein said selector activating means comprises a rocking lever fixedly secured to said main drive shaft.

31. The apparatus of claim 30 wherein said multi-function drive means includes a first outwardly extending cam surface which engages said rocking lever in a first direction to operate same in said reset mode of operation after said carriage has been moved between its first and second position, and which engages said rocking lever in a second direction to operate same in said select mode of operation during the initial travel of said multi-function drive means before said carriage begins to move between its second and first position.

32. The apparatus of claim 31 and further including reversible motive means for moving and multi-function drive means in opposite directions; and further including first switch means mounted on said frame and engaged by said multi-function drive means after a predetermined extent of travel of said multi-function drive means after said carriage has moved to its second position for reversing the operation of said motive means.

33. The apparatus of claim 31 and further including a pressure plate movably secured to said frame for biasingly maintaining said preselected one of said media in said viewing area; and wherein said first outwardly extending cam surface engages said pressure plate and drives same out of the path of travel of said carriage during the initial travel of said multi-function drive means before said carriage begins to move between its first and second position.

34. The apparatus of claim 33 and further including reversible motive means for moving and multi-function drive means in opposite directions; and further including first switch means mounted on said frame and engaged by said multi-function drive means after a predetermined extent of travel of said multi-function drive means after said carriage has moved to its second position for reversing the operation of said motive means; and further including second switch means mounted on said frame and engaged by said multi-function drive means after a predetermined extent of travel of said multi-function drive means after said carriage has moved to its first position for reversing and deactivating the operation of said motive means.

35. The apparatus of claim 33 wherein said first outwardly extending cam surface disengages said pressure plate and allows it to return toward its biased position after said carriage has been moved between its second and first position.

36. The apparatus of claim 35 wherein said frame includes a planar member against the under surface of which said pressure plate is biasingly urged; said planar member including a pivotally mounted accommodation portion movable out of the plane of said planar member to accommodate rotational movement of said container about the rear edge of said carriage when said pressure plate urges said preselected one of said media against the under surface of said planar member.

37. The apparatus of claim 1 and further including a support base; said frame being movably mounted on said support base for motion in transverse directions with respect thereto.

38. The apparatus of claim 1 wherein said container has a predetermined length.

39. The apparatus of claim 38 wherein said carriage has a predetermined length relative to the predetermined length of said container such that the rear edge of said carriage is disposed approximately midway of the length of said container when said container is supported on said carriage and aligned by said upstanding alignment projection.

40. The apparatus of claim 39 and further including a pressure plate movably secured to said frame for biasingly maintaining said preselected one of said media in said viewing area; and wherein said frame includes a planar member against the under surface of which said pressure plate is biasingly urged; said planar member including a pivotally mounted accommodation portion movable out of the plane of said planar member to accommodate rotational movement of said container about the rear edge of said carriage when said pressure plate urges said preselected one of said media against the under surface of said planar member.

41. The apparatus of claim 1; wherein said container has a predetermined length; the distance between said first and second positions of said container and carriage respectively is less than the predetermined length of said container; whereby the trailing edge of said preselected one of said media will remain interleaved between remaining ones of said plurality of media when said carriage moves said container between its second and first position and said selection means retains said preselected one of said media in said viewing area.

* * * * *